(12) United States Patent
Baudot et al.

(10) Patent No.: US 10,359,652 B2
(45) Date of Patent: Jul. 23, 2019

(54) INTEGRATED ELECTRO-OPTIC MODULATOR

(71) Applicant: STMicroelectronics (Crolles 2) SAS, Crolles (FR)

(72) Inventors: Charles Baudot, Lumbin (FR); Maurin Douix, Grenoble (FR); Frederic Boeuf, Le Versoud (FR); Sébastien Cremer, Sassenage (FR)

(73) Assignee: STMICROELECTRONICS (CROLLES 2) SAS, Crolles (FR)

( * ) Notice: Subject to any disclaimer, the term of this patent is extended or adjusted under 35 U.S.C. 154(b) by 0 days.

(21) Appl. No.: 15/868,642

(22) Filed: Jan. 11, 2018

(65) Prior Publication Data

US 2018/0136496 A1    May 17, 2018

Related U.S. Application Data

(62) Division of application No. 15/084,645, filed on Mar. 30, 2016, now Pat. No. 9,891,450.

(30) Foreign Application Priority Data

Sep. 16, 2015 (FR) ..................... 15 58668
Sep. 16, 2015 (FR) ..................... 15 58669

(51) Int. Cl.
*G02F 1/035* (2006.01)
*G02F 1/025* (2006.01)
*G02F 1/015* (2006.01)

(52) U.S. Cl.
CPC ...... *G02F 1/025* (2013.01); *G02F 2001/0151* (2013.01)

(58) Field of Classification Search
CPC .......... G02B 2006/12176; G02F 1/025; G02F 2001/0151
See application file for complete search history.

(56) References Cited

U.S. PATENT DOCUMENTS

| | | | |
|---|---|---|---|
| 7,657,130 B2 | 2/2010 | Shastri et al. | |
| 9,310,629 B2 | 4/2016 | Patel et al. | |

(Continued)

FOREIGN PATENT DOCUMENTS

| | | |
|---|---|---|
| WO | 2014155450 A1 | 10/2014 |
| WO | 2015112814 A1 | 7/2015 |
| WO | 2015112921 A1 | 7/2015 |

OTHER PUBLICATIONS

Wu, Xiaotie, "High Performance Optical Transmitter for Next Generation Superconducting and Data Communication," (Doctoral dissertation), pp. 1-184, http://repository.upenn.edu/cgi/viewcontent.cgi?article=1978&context=edissertations.

(Continued)

*Primary Examiner* — Ellen E Kim
(74) *Attorney, Agent, or Firm* — Slater Matsil, LLP

(57) ABSTRACT

An E/O phase modulator may include a waveguide having an insulating substrate, a single-crystal silicon strip and a polysilicon strip of a same thickness and doped with opposite conductivity types above the insulating substrate, and an insulating interface layer between the single-crystal silicon strip and polysilicon strip. Each of the single-crystal silicon strip and polysilicon strip may be laterally continued by a respective extension, and a respective electrical contact coupled to each extension.

20 Claims, 6 Drawing Sheets

(56) References Cited

U.S. PATENT DOCUMENTS

| | | |
|---|---|---|
| 9,523,870 B2 | 12/2016 | Wei et al. |
| 2010/0060970 A1* | 3/2010 | Chen ................. G02F 1/025 359/245 |
| 2011/0180795 A1 | 7/2011 | Lo et al. |
| 2011/0211786 A1 | 9/2011 | Ushida et al. |
| 2012/0033910 A1 | 2/2012 | Morini et al. |
| 2013/0064491 A1 | 3/2013 | Fujikata et al. |
| 2014/0248019 A1* | 9/2014 | Witzens ............. G02F 1/0121 385/2 |
| 2015/0357413 A1 | 12/2015 | Zhang et al. |

OTHER PUBLICATIONS

Abraham et al., "Evaluation of the performances of a silicon optical modulator based on a silicon-oxide-silicon capacitor," IEEE, 2014, pp. 1-2.

Milivojevic et al., "Silicon high speed modulator for advanced modulation—device structures and exemplary modulator performance," Silicon Photonics IX, SPIE, vol. 8990, pp. 1-10.

* cited by examiner

INTEGRATED ELECTRO-OPTIC MODULATOR

This is a divisional application of U.S. application Ser. No. 15/084,645, entitled "Integrated Electro-Optic Modulator" filed on Mar. 30, 2016, which claims priority to French Patent Application No. 15/58668 and French Patent Application No. 15/58669, each filed on Sep. 16, 2015, all of which are incorporated herein by reference in their entirety.

TECHNICAL FIELD

The present disclosure relates to an electro-optic modulator, and more particularly to a silicon electro-optic modulator and related methods.

BACKGROUND

Electro-optic (E/O) modulators are devices used in optical transmission systems for varying the phase or the amplitude of a laser beam. The phase or amplitude variations of the laser beam enable it to encode data which are then transmitted via the laser beam. Phase modulators may be used in laser beam amplitude modulation systems, for example, modulators of Mach-Zehnder type.

FIG. 1A is a partial simplified reproduction of FIG. 3.1.A of Xiaotie Wu's thesis entitled "High performance optical transmitter for next generation superconducting and data communication". This drawing shows an example of an E/O amplitude modulator of Mach-Zehnder type. Mach-Zehnder type modulator 1 comprises a first waveguide 3 divided into two waveguides, or arms, 5 and 7 of same length, arms 5 and 7 being subsequently gathered in a waveguide 9. Each of arms 5 and 7 has an E/O phase modulator 11 inserted therein. Waveguides 3, 5, 7, and 9 are made of silicon and are formed from a Silicon On Insulator (SOI) silicon layer.

In operation, an input laser beam is injected into waveguide 3. The input laser beam is then separated into a first secondary laser beam propagating in arm 5 and a second secondary laser beam, of same phase and of same amplitude as the first one, propagating in arm 7. Phase modulator 11 of one and/or the other of arms 5 and 7 enables to introduce a phase shift between the two secondary beams. Thus, when the two secondary beams are gathered in a same output beam in waveguide 9, optical interferences occur, whereby the amplitude of the output beam is modulated.

FIG. 1B is a partial simplified copy of FIG. 3.1.B of the above-mentioned thesis. FIG. 1B is a cross-section view along plane BB of FIG. 1A showing an example of an E/O phase modulator of the Silicon Insulator Silicon CAPacitor (SISCAP) type. Phase modulator 11 comprises a doped single-crystal silicon strip 13 of a first conductivity type. Strip 13 rests on an insulating layer (not shown) itself resting on a substrate (not shown) and forms a portion of an SOI-type layer. Modulator 11 further comprises a doped polysilicon strip 15 of the second conductivity type. A portion 17 of strip 15 covers a portion 19 of strip 13, portions 17 and 19 being separated from each other by an interface layer made of a dielectric material (not shown), which forms a capacitor. Each of strips 13 and 15 is coupled to an electric contact, respectively 21 and 22. The assembly of strips 13 and 15 is encapsulated in a dielectric material (not shown) having a smaller optical index than strips 13 and 15. Portions 17 and 19 thus form a waveguide 23 capable of propagating a laser beam along a direction orthogonal to the plane of the sheet.

The phase modulator is manufactured by deposition and etching of a polysilicon layer on the upper surface of a single-crystal silicon layer coated with an insulating interface layer. As a result, the upper surface of the polysilicon strip and the upper surface of the single-crystal silicon strip are not at the same level. In operation, the charge density in portions 17 and 19 is modified by applying a potential difference between contacts 21 and 22. This results in a modification of the optical index of the waveguide and thus in a phase shift of the laser beam propagating in the waveguide. A modulator of the type in FIG. 1B has various disadvantages, at least some of which are desired to be overcome.

SUMMARY

Generally speaking, an E/O phase modulator may include a waveguide having an insulating substrate, a single-crystal silicon strip and a polysilicon strip of a same thickness and doped with opposite conductivity types above the insulating substrate, and an insulating interface layer between the single-crystal silicon strip and polysilicon strip. Each of the single-crystal silicon strip and polysilicon strip may be laterally continued by a respective extension, and a respective electrical contact coupled to each extension.

Another aspect is directed to a method for making an E/O phase modulator. The method may include providing a doped single-crystal silicon layer of a first conductivity type above an insulating substrate, etching a first cavity crossing the single-crystal silicon layer down to the insulating substrate, and forming an insulating interface layer on sides of the first cavity. The method may include filling the first cavity with doped polysilicon of a second conductivity type, up to an upper level of the single-crystal silicon layer, defining a single-crystal silicon strip laterally continued by a thinner portion by etching a second cavity across a portion of a thickness of the single-crystal silicon layer, defining a polysilicon strip adjacent to the single-crystal silicon strip and laterally continued by a thinner portion by etching a third cavity across a portion of a thickness of the polysilicon layer, and filling the second and third cavities and covering the strips with an insulator.

Another aspect is directed to an E/O phase modulator comprising a waveguide. The waveguide may include an insulating substrate, a single-crystal silicon strip and a polysilicon strip doped with opposite conductivity types above the insulating substrate, an insulating interface layer between the single-crystal silicon strip and polysilicon strip, and first and second lateral extensions respectively for the single-crystal silicon and polysilicon strips. Each comprises a first portion having an upper surface at a level of an upper surface of the polysilicon strip, a contact over the first portion, and a second portion extending respectively from the single-crystal silicon and polysilicon strips to the first portion. The second portion of the lateral extension of the single-crystal silicon strip may have a thickness less than that of the single-crystal silicon strip.

A method is for making an E/O phase modulator. The method may include providing a doped single-crystal silicon layer of a first conductivity type over an insulating substrate, etching a first cavity to a first depth in the doped single-crystal silicon layer, and defining a single-crystal silicon strip laterally extending on at least one side thereof by an extension by etching from a bottom of the first cavity, a second cavity extending into the doped single-crystal silicon layer and down to a second depth greater than the first depth, and a third cavity extending into the doped single-crystal silicon layer down at least to the second depth. The method may include filling with a first insulating material the first, second, and third cavities up to an upper level of the doped single-crystal silicon layer, exposing an upper surface of the single-crystal silicon strip by etching a fourth cavity in the first insulating material, and forming an insulating interface layer over the upper surface of the single-crystal silicon strip. The method may include filling the fourth cavity with doped polysilicon of a second conductivity type, up to the upper level of the doped single-crystal silicon layer, covering the doped polysilicon and the doped single-crystal silicon layer with a second insulating material, and forming a plurality of contacts through the second insulating material to a portion of the extension and a portion of the doped polysilicon having upper surfaces at the upper level of the doped single-crystal silicon layer.

DETAILED DESCRIPTION OF ILLUSTRATIVE EMBODIMENTS

Figure 1A:
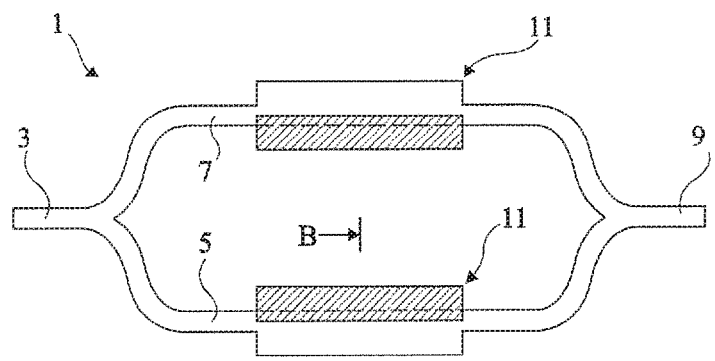
FIGS. 1A and 1B are from FIGS. 3.1.A and 3.1.B of the above-mentioned thesis to Wu, according to the prior art.

The foregoing and other features and advantages will be discussed in detail in the following non-limiting description of specific embodiments in connection with the accompanying drawings. The same elements have been designated with the same reference numerals in the different drawings and, further, the various drawings are not to scale. For clarity, only those elements which are useful to the understanding of the described embodiments have been shown and are detailed. In particular, the deposition and the etching of certain masking layers have not been described. In the following description, terms "top", "upper", "lower", "vertical", and "lateral" refer to the orientation of the concerned elements in the corresponding drawings. Unless otherwise specified, expression "in the order of" and term "substantially" mean to within 10%, preferably to within 5%, when they concern a value, and to within 5 nm, preferably to within 1 nm, when they concern a level. Further, unless otherwise indicated, a first element "resting on", "coating", or "covering" a second element means that the first and second elements are in contact with each other.

Thus, an embodiment provides an E/O phase modulator comprising a waveguide comprising, on an insulating support, a single-crystal silicon strip and a polysilicon strip of same thickness and doped with opposite conductivity types, said strips being adjacent and separated from each other by an insulating interface layer, each of the strips being laterally continued by an extension coupled to an electric contact.

In some embodiments, the adjacent surfaces of said strips are corrugated. Optionally, the extension of each of the strips comprises a first portion adjacent to the strip and thinner than the strip. According to an embodiment, the first portions have substantially the same thickness. Optionally, each extension comprises a second portion adjacent to the first portion, of same thickness as the strips and topped with an electric contact.

In some embodiments, a silicon-germanium layer is interposed between the insulating interface layer and the single-crystal silicon strip. Optionally, the insulating interface layer is silicon oxide and has a thickness smaller than 10 nm. According to an embodiment, an insulator coats the strips and the extensions, the optical index of the insulator and the optical index of the insulating support being smaller than the optical index of the strips. Another embodiment provides an E/O amplitude modulator comprising a first waveguide dividing into a second waveguide and a third waveguide, the second and third waveguides gathering in a fourth waveguide, one and/or the other of the second and third waveguides comprising an E/O phase modulator such as mentioned hereinabove.

Another embodiment provides a method of manufacturing an E/O phase modulator comprising the steps of: a) providing a doped single-crystal silicon layer of a first conductivity type resting on an insulating support; b) etching a first cavity crossing the single-crystal silicon layer down to the insulating support; c) forming an insulating interface layer on the sides of the first cavity; d) filling the first cavity with doped polysilicon of the second conductivity type up to the upper level of the single-crystal silicon layer; e) defining a single-crystal silicon strip laterally continued by a thinner portion by etching a second cavity across a portion of the thickness of the single-crystal silicon layer; f) defining a polysilicon strip, adjacent to the single-crystal silicon strip and laterally continued by a thinner portion, by etching a third cavity across a portion of the thickness of the polysilicon; g) filling the second and third cavities and covering the strips with an insulator.

Optionally, the etching of the second cavity and the etching of the third cavity are stopped at a same level. In some embodiments, step d) comprises the deposition of a polysilicon layer followed by a step of planarizing etching down to the upper surface of the single-crystal silicon layer. Optionally, the method further comprises, between steps b) and c), forming a silicon-germanium layer on the sides of the first cavity by epitaxy from the single-crystal silicon layer. According to an embodiment, the method further comprises forming through the insulator electric contacts coupled to the thinner portions.

Another embodiment provides an E/O phase modulator comprising a waveguide comprising a doped single-crystal silicon strip of a first conductivity type resting on an insulating support and topped with a doped polysilicon strip of the second conductivity type, said strips being separated from each other by an insulating interface layer, each of the strips being laterally continued by an extension comprising a first portion having its upper surface at the level of the upper surface of the polysilicon strip and coated with an electric contact, and a second portion extending from the strip to the first portion, the second portion of the extension of the single-crystal silicon strip being thinner than the single-crystal silicon strip.

Optionally, the extension of the single-crystal silicon strip extends on a first side of the waveguide and the extension of the polysilicon strip extends on a second side of the waveguide, opposite to the first side. In some embodiments, the single-crystal silicon strip is laterally continued, on the side of the waveguide opposite to the extension of the single-crystal silicon strip, by a prolongation having a thickness smaller than that of the single-crystal silicon strip.

Optionally, the prolongation has the same thickness as the second portion of the extension of the single-crystal silicon strip. According to an embodiment, the second portion of the extension of the polysilicon strip is thinner than the polysilicon strip. Optionally, an insulator covers the entire structure, the optical index of the insulator being smaller than that of said strips.

In some embodiments, a silicon-germanium layer is interposed between the single-crystal silicon strip and the insulating interface layer. Optionally, the insulating interface layer is silicon oxide having a thickness smaller than 10 nm. Another embodiment provides an E/O amplitude modulator comprising a first waveguide separating into a second waveguide and a third waveguide, the second and third waveguides joining each other in a fourth waveguide, one and/or the other of the second and third waveguides comprising an E/O phase modulator such as mentioned hereinabove.

Another embodiment provides a phase modulator manufacturing method comprising the steps of: a) providing a doped single-crystal silicon layer of a first conductivity type resting on an insulating support; b) etching a first cavity penetrating down to a first depth into the single-crystal silicon layer; c) defining a single-crystal silicon strip laterally continued on at least one side by an extension by etching, from the bottom of the first cavity, a second cavity penetrating into the single-crystal silicon layer down to a second depth greater than the first depth, and a third cavity penetrating into the single-crystal silicon layer down to the second depth or all the way to the insulating support; d) filling with a first insulating material the first, second, and third cavities up to the upper level of the silicon layer; e) exposing the upper surface of the strip by etching a fourth cavity in the first insulating material; f) forming an insulating interface layer covering the upper surface of the strip; g) filling the fourth cavity with doped polysilicon of the second conductivity type up to the upper level of the silicon layer; h) covering the polysilicon and the single-crystal silicon with a second insulating material; and i) forming electric contacts through the second insulating material all the way to a portion of the extension and a portion of the polysilicon having its upper surfaces at the upper level of the silicon layer.

According to an embodiment, the method further comprises, after step g), etching, beyond the strip, a fifth cavity penetrating into part of the thickness of the polysilicon. Optionally, the method further comprises, between steps e) and f), forming a silicon germanium layer by epitaxy from the upper surface of the strip. In some embodiments, step g) comprises depositing polysilicon and then performing a planarizing etching of the polysilicon down to the upper level of the silicon layer. Optionally, the first and the second insulating materials are identical.

In the following description, two different embodiments of an E/O phase modulator and their respective method of manufacturing are described.

Figure 2:
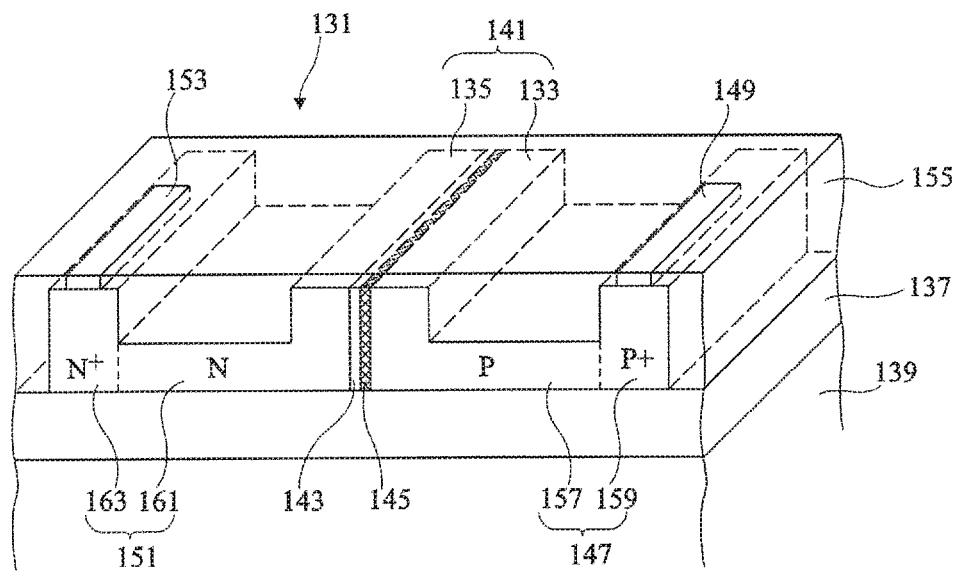
FIG. 2 is a schematic perspective cross-section view (along a plane orthogonal to a propagation direction of an optical signal in the modulator) showing a first embodiment of an E/O phase modulator, according to the present disclosure.

Referring now to FIG. 2, a modulator 131 comprises a doped single-crystal silicon strip 133 of a first conductivity type, for example, type P, and a doped polysilicon strip 135 of the second conductivity type, for example, type N. Strips 133 and 135 both rest on an insulating layer 137 arranged on a semiconductor substrate 139. Strips 133 and 135 are adjacent and extend longitudinally along a same direction corresponding to the propagation direction of the laser beam, strips 133 and 135 thus forming a waveguide 141. An insulating interface layer 143 is interposed between the adjacent surfaces of strips 133 and 135. Insulating interface layer 143 has a thickness smaller than 10 nm when it is made of silicon oxide and has a corresponding thickness when it is made of another insulating material to take into account the electric permittivity of this other insulating material with respect to that of silicon oxide.

Between strips 133 and 135, insulating interface layer 143 extends substantially orthogonally to the upper surface of insulating layer 137. In this example, optional silicon-germanium layer 145 is interposed between strip 133 and insulating interface layer 143. On the side opposite to polysilicon strip 135, single-crystal silicon strip 133 is laterally continued by an extension 147 coupled to an electric contact 149. Symmetrically, on the side opposite to single-crystal silicon strip 133, polysilicon strip 135 is laterally continued by an extension 151 coupled to an electric contact 153. An insulator 155 covers strips 133 and 135 and extensions 147 and 151, the optical index of the insulator being smaller than that of strips 133 and 135.

In this example, extension 147 comprises a portion 157 and a portion 159, portion 157 being thinner than strip 133 and laterally extending from strip 133 to portion 159 having electric contact 149 resting thereon. Portion 159 has the same thickness as strip 133. Portion 159 is heavily doped with the first conductivity type (P+) to decrease the resistance between contact 149 and strip 133. Symmetrically, in this example extension 151 comprises a portion 161, of same thickness as portion 157, laterally extending all the way to a portion 163 having contact 153 resting thereon, portion 163 having the same thickness as portion 159. Portion 163 is heavily doped with the second conductivity type (N+).

In operation, when a potential difference is applied between contacts 149 and 153, the charge density in strips 133 and 135 is modified, which results in a variation of the optical index of the waveguide and in a phase shift of the laser beam propagating in the waveguide. According to an advantage, waveguide 141 is symmetrical, whereby the transverse electric modes of the laser beam propagating in waveguide 141 undergo no rotation, conversely to the case of a waveguide of the type in FIG. 1B. According to another advantage, due to the fact that portions 157 and 161 laterally bordering waveguide 141 have a thickness smaller than the latter, and that waveguide 141 is symmetrical, the laser beam is better confined in waveguide 141 than in a waveguide of the type in FIG. 1B.

Figure 1B:
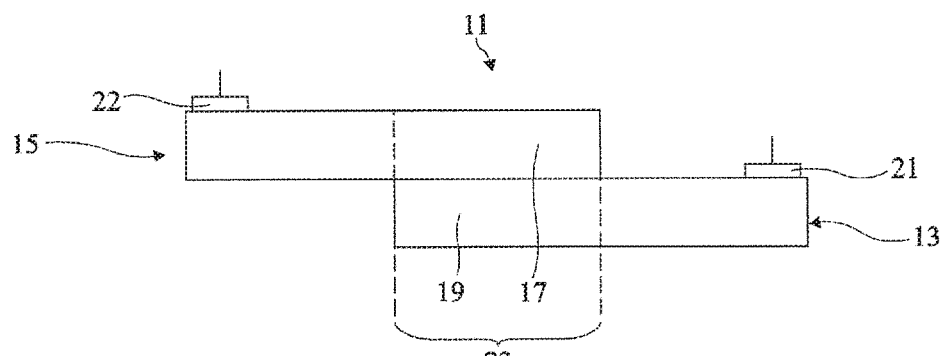

As a result of the above-mentioned advantages, the dimensions of a modulator of the type in FIG. 2 may be decreased with respect to those of a modulator of the type in FIG. 1B. Indeed, the waveguide of a modulator of the type in FIG. 1B should have a significant width so that the laser beam is properly confined in the waveguide and that its transverse electric modes undergo no rotation. For example, for a laser beam having a wavelength between 1 and 2 µm, a waveguide of the type in FIG. 1B has a width of at least 800 nm, to be compared with approximately 400 nm for a waveguide of the type in FIG. 2.

Figure 3A:
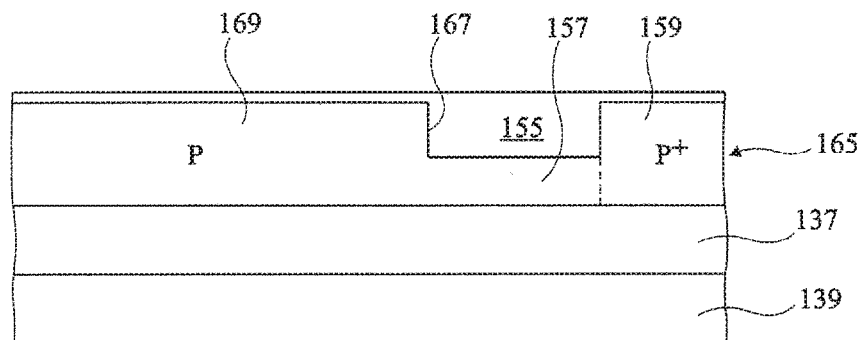
FIGS. 3A to 3F are schematic cross-section views of steps of a method of manufacturing a modulator of the type in FIG. 2.

FIG. 3A shows a structure comprising a doped single-crystal silicon layer or layer portion 165, of the first conductivity type (P), resting on an insulating layer 137, itself resting on a semiconductor substrate 139, layers 165 and 137 forming a SOI-type structure. A cavity 167 has been etched in layer 165. Cavity 167 penetrates across a portion of the thickness of layer 165 to define therein a portion 169 laterally continued by a thinner portion 157. In this example, the etching of cavity 167 is performed so that portion 157 extends laterally from portion 169 all the way to a portion 159 of single-crystal silicon layer 165, portions 159 and 169 having the same thickness. A layer of an insulating material 155 has then been deposited and removed by planarizing etching, for example, by Chemical-Mechanical Polishing (CMP), to fill cavity 167. As shown herein, an implantation step may be carried out so that portion 159 is heavily doped with the first conductivity type (P+). As an example, insulator 155 is made of silicon oxide. Insulating layer 137 may also be made of silicon oxide.

Figure 3B:
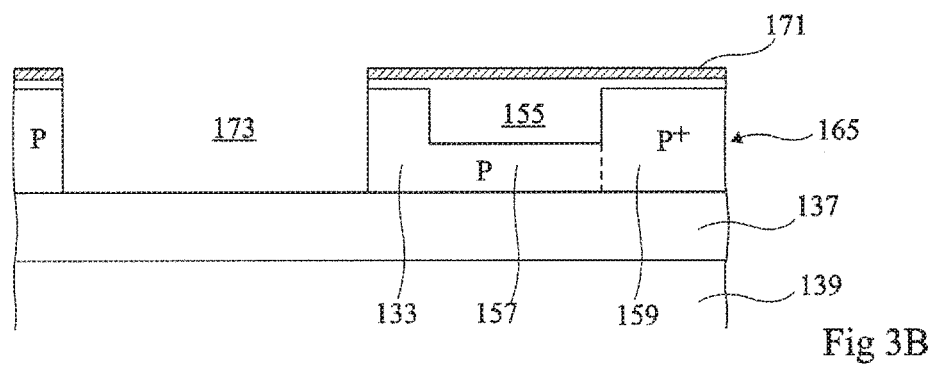

FIG. 3B shows the structure of FIG. 3A after the deposition of a masking layer 171, for example, made of silicon nitride, and the etching of a cavity 173 crossing portion 169 down to insulating layer 137 to leave in place a single-crystal silicon strip 133 adjacent to portion 157.

Figure 3C:
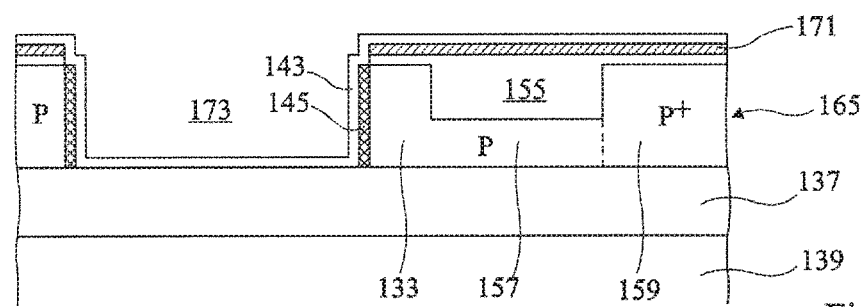

FIG. 3C shows the structure of FIG. 3B after the forming of an optional silicon-germanium layer 145 on the sides of cavity 173, by epitaxy from single-crystal silicon layer 165. An insulating interface layer 143 is then deposited on the exposed surface of the structure to cover the sides of cavity 173. As an example, the thickness of silicon-germanium layer 145 is in the range from 5 to 20 nm, for example, equal to 10 nm, and layer 145 may comprise from 20 to 40% of germanium, for example, 30%. Insulating interface layer 143 may have a thickness smaller than 10 nm, for example, equal to 3.5 nm, when it is made of silicon oxide. The material of insulating interface layer 143 may also be silicon nitride, silicon oxynitride, or a material of high dielectric constant such as hafnium oxide. In the case where the insulating interface layer is made of a material of high dielectric constant, its thickness may be greater than in the case where it is made of silicon oxide.

Figure 3D:
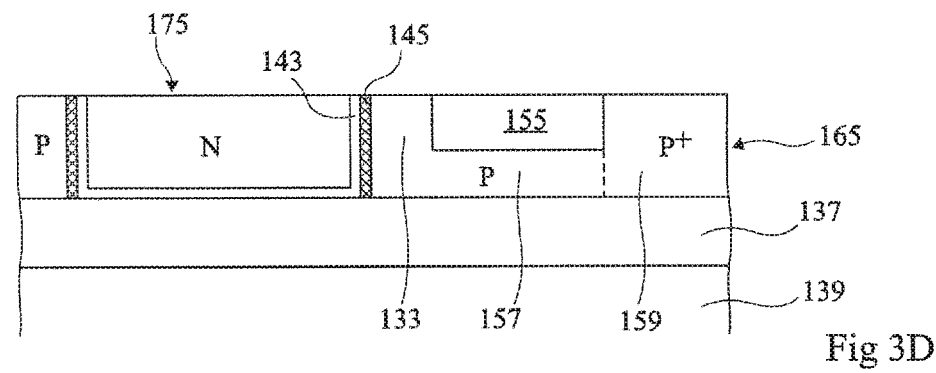

FIG. 3D shows the structure of FIG. 3C after the deposition of a polysilicon layer and a step of planarizing, etching, or of CMP of the deposited silicon down to the upper surface of single-crystal silicon layer 165 to fill cavity 173 and form a polysilicon region 175 therein. The polysilicon of region 175 is doped with the second conductivity type (N) during the deposition thereof or during an implantation step performed after the deposition thereof.

Figure 3E:
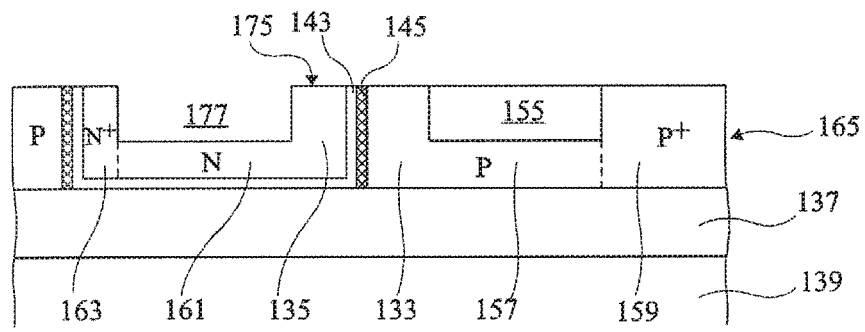

FIG. 3E shows the structure of FIG. 3D after the etching of a cavity 177 in polysilicon region 175. The cavity penetrates across a portion of the thickness of region 175 to define therein a strip 135 laterally continued by a thinner portion 161, strip 135 being adjacent to single-crystal silicon strip 133. In this example, the etching of cavity 177 is performed so that a portion 163 of polysilicon region 175 is left in place and that portion 161 extends laterally from strip 135 all the way to portion 163. Portion 163 then has the same thickness as strips 133 and 135 and as portion 159. Preferably, cavity 177 is etched so that the width and the thickness of polysilicon portion 161 are substantially identical to those of single-crystal silicon portion 157. An implantation step may be carried out so that polysilicon portion 163 is heavily doped with the second conductivity type (N+).

Figure 3F:
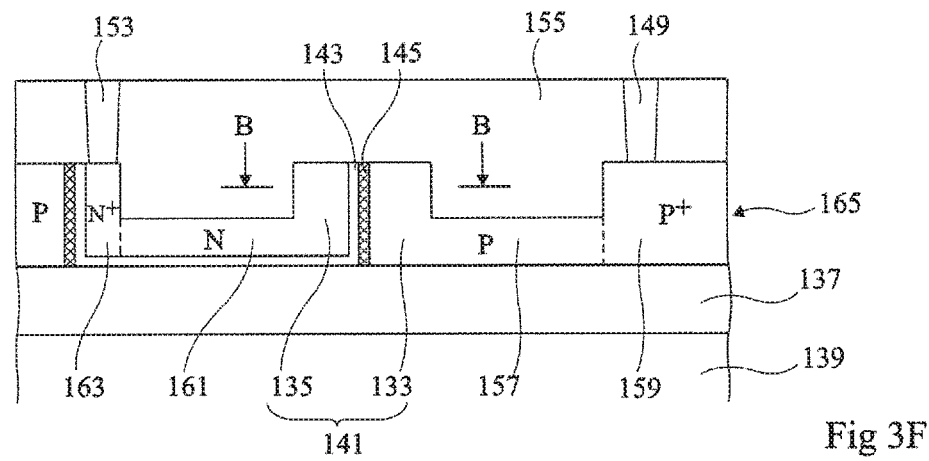

FIG. 3F shows the structure of FIG. 3E after the deposition of a layer of insulator 155 on the exposed surface of the structure and a step of planarizing the upper surface of insulator 155 to fill cavity 177 and to cover strips 133 and 135 and portions 157, 159, 161, and 163. Electric contacts 149 and 153 are then formed through insulator 155, all the way to the upper surfaces of portions 159 and 163. A phase modulator of the type in FIG. 2 comprising a waveguide 141 capable of propagating a laser beam is thus obtained.

The thickness of waveguide 141, that is, the thickness of strips 133 and 135, is substantially equal to that of the initial SOI-type single-crystal silicon layer 165. This simplifies the forming of other components from this SOI-type layer with respect to the case of a modulator of the type in FIG. 1B. This also enables to simplify and to improve the coupling of a waveguide formed in this SOI-type layer with the modulator of FIG. 3F with respect to the case of a modulator of the type in FIG. 1B.

As an example, the case where the wavelength of the laser beam to be propagated is in the range from 1 to 2 µm, more particularly from 1.3 to 1.5 µm, which corresponds to the wavelengths currently used in optical transmission systems, is considered. In this case, the doping levels may be in the range from 1015 to 1018 at.cm−3, for example, 1016 at.cm−3, for strips 133 and 135, and the modulator has, for example, the following dimensions: a thickness from 200 to 400 nm, for example, in the range from 300 to 310 nm, for the SOI-type silicon layer, and thus for strips 133 and 135; a thickness from 0.2 to 2.5 µm, for example, in the order of 700 nm for insulating layer 137; a thickness greater than 50 nm, for example, in the range from 50 to 160 nm, for portions 157 and 161, a 50 nm thickness providing a better confinement of the beam in the waveguide than a thickness greater than 50 nm; and a width in the range from 320 to 600 nm, for example, 400 nm, for the active portion of the modulator, that is, the assembly comprising strips 133 and 135, insulating interface layer 143, and possibly silicon-germanium layer 145.

Figures 4A, 4B, 4C:
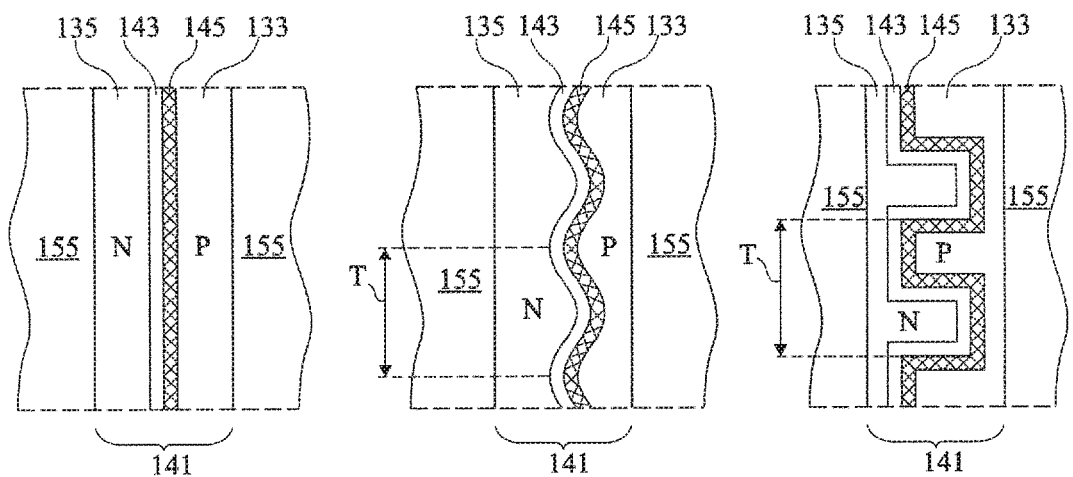
FIGS. 4A to 4C are schematic top views in plane BB of FIG. 3F illustrating variations of the E/O phase modulator of FIG. 3F.

FIGS. 4A to 4C show strips 133 and 135 separated by insulating interface layer 143 and optional silicon-germanium layer 145, and bordered with insulator 155. In FIG. 4A, as in FIG. 2, insulating interface layer 143 and silicon-germanium layer 145 rectilinearly extend along the propagation direction of a laser beam in waveguide 141 of the modulator.

In FIGS. 4B and 4C, the adjacent surfaces of strips 133 and 135, and thus layers 143 and 145 interposed between these adjacent surfaces, are corrugated in the laser beam propagation direction. The corrugations have a sinusoidal shape in FIG. 4B and a square shape in FIG. 4C. The corrugations may also have other shapes, for example, a saw tooth shape. In these examples, the corrugations are periodic. Period T of the corrugations is then selected so that the waveguide has a minimum reflectivity on propagation of a laser beam of a given wavelength.

Advantageously, the surface of the capacitor formed from strips 133 and 135 separated from each other by insulating interface layer 143 increases when insulating interface layer 143 is corrugated. Thus, for a same voltage applied to the modulator, the optical index variation, and thus, the resulting phase shift, may be more significant in a modulator of the type in FIGS. 4B and 4C than in a modulator of the type in FIG. 4A.

The embodiments and the variations previously described in relation with FIGS. 2 to 4C may be modified by those skilled in the art. In particular, the previously-indicated conductivity types of the various layers, strips, portions, and regions may all be inverted. The dimensions indicated as an example may be adapted to specific technologies. In the method described in relation with FIGS. 3A to 3F, according to the etching type used to etch cavity 173, the sides of cavity 173 may be inclined with respect to a direction orthogonal to the upper surface of insulating layer 137, for example, by an angle which may range up to 15°. This angle is preferably selected to correspond to the Brewster angle.

The order and the number of the steps of the previously-described method may be modified. An additional step of siliciding the upper surface of portions 159 and 163 may be provided before the forming of contacts 149 and 153. Although an embodiment of a method where cavity 167 is etched before cavity 173 and before the forming of polysilicon region 175, cavity 167 may be etched at other steps, for example, after the forming of polysilicon region 175, before or after the etching of cavity 177 in the polysilicon. Further, at the step illustrated in FIG. 3C, it is possible for insulating interface layer 143 to only be formed on the sides of cavity 173 by thermal oxidation of single-crystal silicon layer 165 or of the silicon germanium layer when the latter is present. It may also be provided to replace insulating interface layer 143 with a stack of insulating layers. Although a method comprising the deposition of silicon in polycrystalline form has been described, it may also be provided to deposit silicon in amorphous form and then to subsequently re-crystallize it.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

Figure 5:
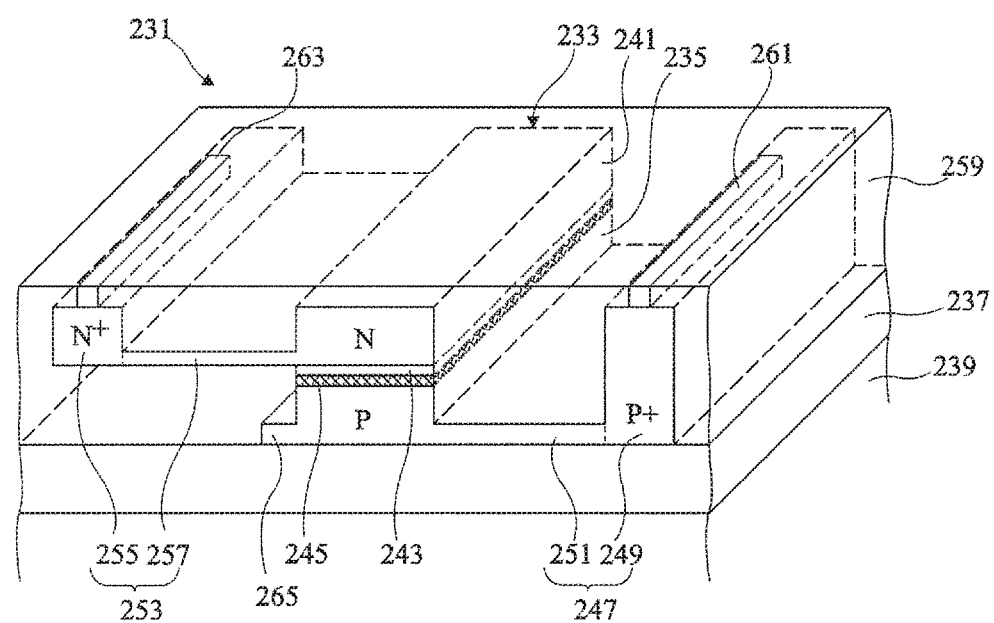
FIG. 5 is a schematic cross-section perspective view (along a plane orthogonal to a propagation direction of an optical signal in the modulator) showing a second embodiment of an E/O phase modulator, according to the present disclosure.

Referring now to FIG. 5, a modulator 231 comprises a waveguide 233 comprising a doped single-crystal silicon strip 235 of a first conductivity type, in this example, type P, resting on an insulating layer 237 arranged on a substrate 239. Strip 235 forms a portion of an SOI-type silicon layer. Waveguide 233 further comprises a doped polysilicon strip 241 of the second conductivity type (N) covering the entire upper surface of strip 235. An insulating interface layer 243 and an optional silicon germanium layer 245 are interposed between strips 235 and 241. The assembly of strips 235 and 241 and of insulating interface layer 243 thus forms a capacitor. Insulating interface layer 243 has a thickness smaller than 10 nm when it is made of silicon oxide, and has a corresponding thickness when it is made of another insulating material to take into account the electric permittivity of this other insulating material with respect to that of silicon oxide. Single-crystal silicon strip 235 is laterally continued by an extension 247, on the right-hand side of FIG. 5, comprising a portion 249 having its upper surface substantially at the level of the upper surface of polysilicon strip 241, and a portion 251, thinner than strip 235, extending from strip 235 to portion 249. Polysilicon strip 241 is laterally continued by an extension 253, on the left-hand side of FIG. 5, comprising a portion 255 having its upper surface substantially at the level of the upper surface of strip 241, and a portion 257 extending from strip 241 to portion 255. An insulator 259 extends under extension 253 and covers strip 235 and 241 and extensions 247 and 253, the optical index of insulator 259 being smaller than that of silicon strip 235 and 241. Electric contacts 261 and 263 extend through the insulator all the way to the upper surfaces of portions 249 and 255, respectively. To decrease the resistance between contact 261 and strip 235, and between contact 263 and strip 241, portion 249 is more heavily-doped with the first conductivity type (P+) than strip 235, and portion 255 is more heavily doped with the second conductivity type (N+) than strip 241.

In this example, single-crystal silicon strip 235 is laterally continued, on the side opposite to that of extension 247, by an extension 265 thinner than strip 235, for example, of same thickness as portion 251 of extension 247. In a variation, extension 265 is omitted. Further, portion 257 of extension 253 of polysilicon strip 241 is thinner than the latter. In a variation, portion 257 has substantially the same thickness as portion 255 and polysilicon strip 241.

In operation, when a potential difference is applied between contacts 261 and 263, the charge density in strips 235 and 241 is modified, which results in a variation of the optical index of the waveguide and in a phase shift of the laser beam propagating in the waveguide. According to an advantage, due to the fact that single-crystal silicon strip 235 of waveguide 233 is laterally bordered with a portion 251 and possibly with a prolongation 265 having thicknesses smaller than that of strip 235, the laser beam is better confined in waveguide 233 than in a waveguide of the type in FIG. 1B. The confinement of the laser beam in waveguide 233 is even better when, as shown in FIG. 5, the thickness of portion 257 adjacent to polysilicon strip 241 is smaller than that of strip 241.

As a result, the dimensions of a modulator of the type in FIG. 5 may be decreased with respect to those of a modulator of the type in FIG. 1B. Indeed, the waveguide of a modulator of the type in FIG. 1B should have a significant width so that the laser beam is properly confined in the waveguide. For example, for a laser beam having a wavelength between 1 and 2 μm, a waveguide of the type in FIG. 1B has a width of at least 800 nm to be compared with 350 nm approximately for a waveguide of the type in FIG. 5.

Figure 6A:
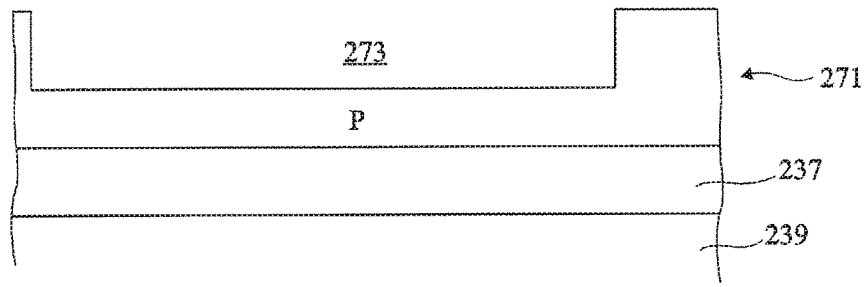
FIGS. 6A to 6G are schematic cross-section views of steps of a method of manufacturing a modulator of the type in FIG. 5.

FIG. 6A shows a structure comprising a doped single-crystal silicon 271 of the first conductivity type (P) resting on an insulating layer 237 arranged on a substrate 239. At the location where the modulator is desired to be formed, a cavity 273 has been etched across part of the thickness of silicon layer 271.

Figure 6B:
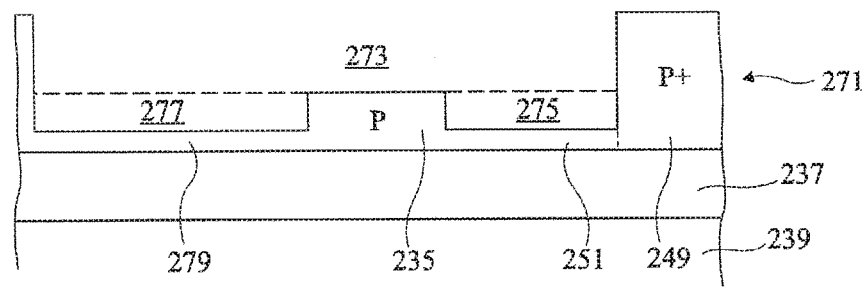

FIG. 6B shows the structure of FIG. 6A after etching, from the bottom of cavity 273, of a cavity 275 and of a cavity 277 penetrating through a portion of the thickness of single-crystal silicon layer 271. Cavities 275 and 277 are etched to define a single-crystal silicon strip 235 laterally continued by a portion 251 and by a portion 279 thinner than strip 235, portions 251 and 279 being respectively arranged on one side and on the other of strip 235. An implantation step may be carried out so that a portion 249 of silicon layer 271, adjacent to portion 251, is heavily doped with the first conductivity type (P+). In this example, the etching of cavities 275 and 277 is stopped at the same level and portions 251 and 279 have the same thickness. In an alternative embodiment, cavity 277 is etched all the way to insulating layer 237 so that strip 235 is only bordered by portion 251.

Figure 6C:
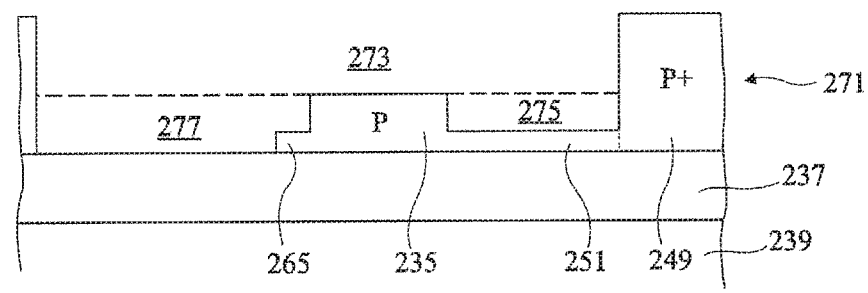

FIG. 6C shows the structure of FIG. 6B after an optional step of etching part of portion 279, all the way to insulating layer 237, to leave in place an extension 265 adjacent to strip 235. This step is not carried out if, at the step of FIG. 6B, cavity 277 is etched down to insulating layer 237, and, in this case, extension 265 does not exist.

Figure 6D:
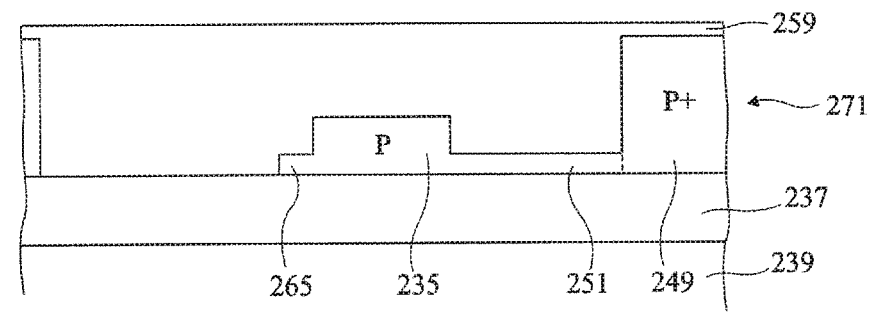

FIG. 6D shows the structure of FIG. 6C after a layer of an insulating material 259 has been deposited and then removed by CMP, to cover the entire structure and so that the upper surface of insulating material 259 is planar. As an example, insulator 259 is made of silicon oxide. Insulating layer 237 having the structure formed thereon may also be made of silicon oxide.

Figure 6E:
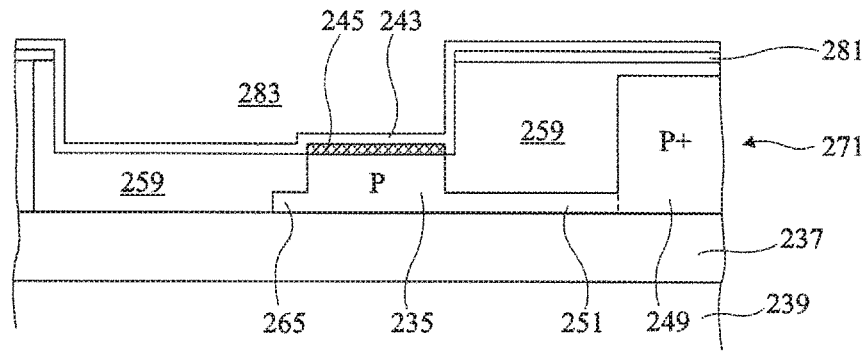

FIG. 6E shows the structure of FIG. 6D after the deposition of a masking layer 281, for example, made of silicon nitride, and the etching of a cavity 283 in insulator 259 to expose the upper surface of strip 235. In this example, cavity 283 extends laterally between a side substantially aligned with one of the sides of strip 235 (on the right-hand side of the drawing) and another side arranged beyond single-crystal silicon strip 235 (on the left-hand side of the drawing). An optional step of epitaxy of a silicon germanium layer 245 on the upper surface of strip 235 may be provided. An insulating interface layer 243 is then formed to cover the entire upper surface of strip 235, insulating interface layer 243 being for example deposited on the entire exposed surface of the structure.

As an example, the thickness of silicon germanium layer 245 is in the range from 5 to 20 nm, for example, equal to 10 nm, and layer 245 may comprise from 20 to 40% of germanium, for example, 30%. Silicon germanium layer 245 favors the storage of charges in single-crystal silicon strip 235. Insulating interface layer 243 may have a thickness smaller than 10 nm, for example, equal to 3.5 nm, when it is made of silicon oxide. The material of insulating interface layer 243 may also be silicon nitride, silicon oxynitride, or a material of high dielectric constant such as hafnium oxide. In the case where the insulating interface layer is made of a material of high dielectric constant, its thickness may be greater than in the case where it is made of silicon oxide.

Figure 6F:
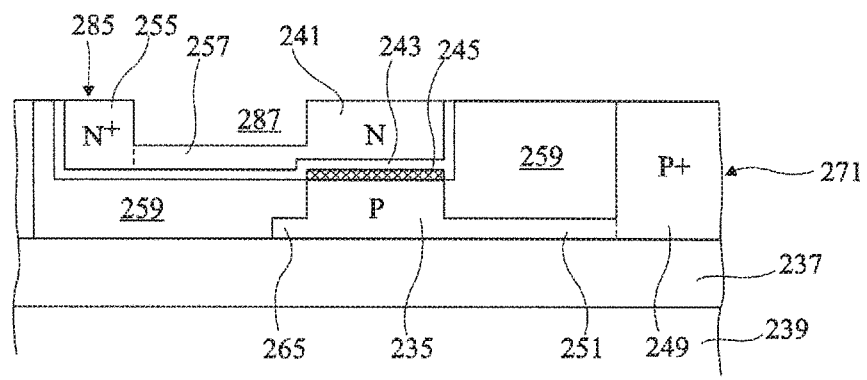

FIG. 6F shows the structure of FIG. 6E after a polysilicon deposition step and a step of CMP of the deposited silicon down to the upper surface of single-crystal silicon layer 271 to fill cavity 283 and form a polysilicon region 285 therein. The polysilicon of region 285 is doped with the second conductivity type (N) during the deposition thereof or during a subsequent implantation step. In the shown example, a cavity 287 has then been etched across part of the thickness of polysilicon region 285 to define therein a strip 241 laterally continued by a thinner portion 257 extending all the way to a portion 255 of region 285. Strip 241 has substantially the same thickness as portion 285. Strip 241 has substantially the same thickness as strip 235 so that strips 235 and 241 define a waveguide with a good lateral delimitation. As shown, an implantation step may be carried out so that portion 255 is heavily doped with the second conductivity type (N+).

To simplify the manufacturing method, it is possible not to etch cavity 287. In this case, strip 241 and portions 255 and 257 have substantially the same thickness. Of course such a simplification causes a decrease in the quality of the waveguide, which however remains satisfactory and greater than that of a waveguide of the type in FIG. 1B.

Figure 6G:
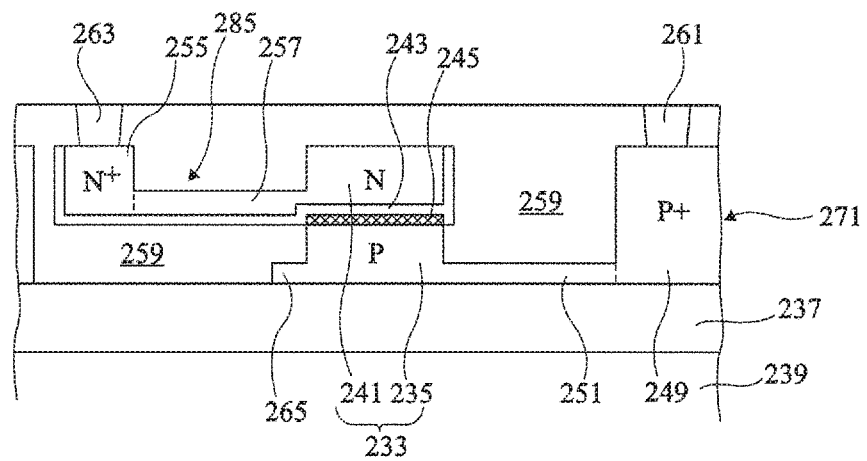

FIG. 6G shows the structure of FIG. 6F after the deposition of an additional layer of insulator 259 on the exposed surface of the structure and a step of planarizing the upper surface of insulator 259 to fill cavity 287 and to cover single-crystal silicon layer 271 and polysilicon region 285. Electric contacts 261 and 263 are then formed through insulator 259, all the way to the upper surfaces of portions 249 and 255, respectively. This thus provides a phase modulator of the type in FIG. 5 comprising a waveguide 233 capable of propagating a laser beam, and a capacitor capable of modifying the phase of the laser beam. This modulator may be introduced into a Mach-Zehnder type modulator to modulate the phase or the amplitude of a laser beam.

The thickness of waveguide 233 is substantially equal to that of initial SOI-type single-crystal silicon layer 271 and the upper surfaces of waveguide 233 and of portions 249 and 255 are at the same level. This simplifies the forming of electric contacts 261 and 263 of the modulator as well as the manufacturing of other components from SOI-type layer 271 with respect to the case of a modulator of the type in FIG. 1B. This also enables to simplify and to improve the coupling of a waveguide formed in this SOI-type layer with the modulator of FIG. 6G with respect to the case of a modulator of the type in FIG. 1B.

As an example, the case where the wavelength of the laser beam to be propagated is in the range from 1 to 2 μm, more particularly from 1.3 to 1.5 μm, which corresponds to the wavelengths currently used in optical transmission systems. In this case, the doping level of strips 235 and 241 may be in the range from 1015 to 1018 at.cm−3, for example, 1016 at.cm−3, and the modulator has, for example, the following dimensions: a thickness from 200 to 400 nm, for example, in the range from 300 to 310 nm, for SOI-type silicon layer 271, and thus for waveguide 233; a thickness from 0.5 to 2.5 μm, for example, in the order of 700 nm for insulating layer 237; a thickness in the order of 50 nm for portions 251 and 257 and extension 265; a thickness greater than 50 nm, for example, in the order of 160 nm, for strips 235 and 241, the latter preferably having substantially the same thickness; and a width in the range from 320 to 600 nm, for example, 400 nm, for waveguide 233.

The embodiments and the variations previously described in relation with FIGS. 5 to 6G may be modified by those skilled in the art. In particular, the previously-indicated conductivity types of the various layers, strips, portions, and regions may all be inverted. The dimensions indicated as an example may be adapted to specific technologies. Although a strip 241 having edges substantially aligned with those of strip 235 has been shown, due to technological limitations on etching of the corresponding cavities, strip 241 may be slightly wider or narrower than strip 235.

In the previously-described modulator, extension 247 of single-crystal silicon strip extends on a first side of the waveguide and extension 253 of polysilicon strip extends on a second side of the waveguide, opposite to the first one. Extensions 247 and 253 may extend on a same side of the waveguide or on each side of the waveguide. The order and the number of the steps of the previously-described method may be modified. A step of siliciding the upper surface of portions 249 and 255 before the forming of contacts 261 and 263 may be provided. At the step illustrated in FIG. 6E, insulating interface layer 243 may only be formed on the upper surface of strip 235 by thermal oxidation of the single-crystal silicon of this strip 235 or of silicon germanium layer 245 when the latter is present. It may also be provided to replace insulating interface layer 243 with a stack of insulating layers.

Although a method comprising the deposition of silicon in polycrystalline form has been described, it may also be provided to deposit silicon in amorphous form and then to subsequently re-crystallize it. A same insulating material 259 has been used at the steps of FIGS. 6D and 6G, it may also be provided to use different insulating materials during these steps.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:
1. A capacitive modulator comprising:
   a first waveguide comprising
      a single-crystal silicon strip disposed above an insulating substrate, the single-crystal silicon strip being doped with a first conductivity type, a polysilicon strip disposed above the insulating substrate and the single-crystal silicon strip, the polysilicon strip at least partially vertically overlapping the single-crystal silicon strip, wherein the polysilicon strip is doped with a second conductivity type opposite the first conductivity type, an interface layer comprising an insulating layer disposed between a top surface of the single-crystal silicon strip and a bottom surface of the polysilicon strip, wherein the single-crystal silicon strip is capacitively coupled to the polysilicon strip through the insulating layer, wherein the polysilicon strip comprises
   a first portion directly contacting the interface layer, the first portion comprising a first upper surface and a first lower surface, and
   a second portion thinner than and directly contacting the first portion, the second portion comprising a second upper surface and a second lower surface, wherein the first lower surface is coplanar with the second lower surface, and wherein the first upper surface is higher than the second upper surface.

2. The capacitive modulator of claim 1, wherein:
the single-crystal silicon strip comprises
   a first portion directly contacting the interface layer,
   a second portion thinner than the first portion, and
   a third portion, wherein the second portion is disposed between the first portion and the third portion, wherein the first portion and the second portion of the single-crystal silicon strip are doped to a first doping concentration, the third portion of the single-crystal silicon strip is doped to a second doping concentration greater than the first doping concentration; and
the first waveguide further comprises an electrical contact coupled to the third portion of the single-crystal silicon strip.

3. The capacitive modulator of claim 2, wherein the first portion of the single-crystal silicon strip and the first portion of the polysilicon strip have a substantially same first thickness.

4. The capacitive modulator of claim 3, wherein the polysilicon strip comprises a third portion, wherein the second portion of the polysilicon strip is disposed between the first portion and the third portion, and wherein the third portion of the single-crystal silicon strip and the third portion of the polysilicon strip each have the substantially same first thickness.

5. The capacitive modulator of claim 2, wherein the second portion of the single-crystal silicon strip and the second portion of the polysilicon strip have a substantially same thickness.

6. The capacitive modulator of claim 1, wherein the insulating layer comprises silicon oxide.

7. The capacitive modulator of claim 1, further comprising:
a second waveguide disposed adjacent to and separated from the first waveguide;
a third waveguide coupled to the first waveguide and to the second waveguide; and
a fourth waveguide coupled to the first waveguide and to the second waveguide, wherein the capacitive modulator is configured to function as an electro-optic amplitude modulator, wherein the third waveguide comprises an input of the electro-optic amplitude modulator, and wherein the fourth waveguide comprises an output of the electro-optic amplitude modulator.

8. The capacitive modulator of claim 1, wherein adjacent surfaces of the single-crystal silicon strip and polysilicon strip are corrugated.

9. The capacitive modulator of claim 1, wherein the insulating layer has a thickness less than 10 nm.

10. A waveguide comprising:
an insulating substrate;
a single-crystal silicon strip disposed above the insulating substrate, the single-crystal silicon strip being doped with a first conductivity type;
a polysilicon strip disposed above the insulating substrate and the single-crystal silicon strip, the polysilicon strip at least partially vertically overlapping the single-crystal silicon strip, wherein the polysilicon strip is doped with a second conductivity type opposite the first conductivity type;
a semiconducting layer having a semiconductor material different than the silicon in the single-crystal silicon strip, the semiconducting layer disposed between a top surface of the single-crystal silicon strip and a bottom surface of the polysilicon strip; and
an insulating layer disposed between the semiconducting layer and the bottom surface of the polysilicon strip, wherein the semiconducting layer and the polysilicon strip are capacitively coupled through the insulating layer.

11. The waveguide of claim 10, wherein the semiconducting layer comprises a silicon-germanium layer.

12. The waveguide of claim 10, wherein adjacent surfaces of the single-crystal silicon strip and polysilicon strip are corrugated.

13. The waveguide of claim 10, wherein the semiconductor material of the semiconducting layer is different than both the silicon in the single-crystal silicon strip and the polysilicon in the polysilicon strip.

14. A method of forming a waveguide, the method comprising:
providing an insulating substrate;
forming a single-crystal silicon strip above the insulating substrate, the single-crystal silicon strip being doped with a first conductivity type;
forming a semiconducting layer above the single-crystal silicon strip, the semiconducting layer having a semiconductor material different than the silicon in the single-crystal silicon strip;
forming an insulating layer above the semiconducting layer; and
forming a polysilicon strip above the insulating layer, the semiconducting layer, and the single-crystal silicon strip, the polysilicon strip at least partially vertically overlapping the single-crystal silicon strip, wherein the polysilicon strip is doped with a second conductivity type opposite the first conductivity type.

15. The method of claim 14, wherein the semiconducting layer comprises a silicon-germanium layer.

16. The method of claim 14, wherein:
a top surface of the single-crystal silicon strip adjacent to the semiconducting layer is corrugated; and
a bottom surface of the polysilicon strip adjacent to the insulating layer is corrugated.

17. The method of claim 14, wherein the semiconductor material of the semiconducting layer is different than both the silicon in the single-crystal silicon strip and the polysilicon in the polysilicon strip.

18. The method of claim 14, further comprising:
etching the single-crystal silicon strip to form
- a first portion directly contacting the semiconducting layer,
- a second portion thinner than the first portion, and
- a third portion comprising a thickness greater than or equal to the first portion, wherein the second portion is disposed between the first portion and the third portion; and forming an electrical contact coupled to the third portion of the single-crystal silicon strip.

19. The method of claim 14, further comprising:
etching the single-crystal silicon strip to form a first portion directly contacting the semiconducting layer and a second portion separate from the semiconducting layer; and implanting the single-crystal silicon strip to dope the second portion with the first conductivity type, wherein a doping concentration of the second portion is greater than a doping concentration of the first portion.

20. The method of claim 14, further comprising:
forming an insulating region over the single-crystal silicon strip and the polysilicon strip, wherein the insulating region directly contacts both the single-crystal silicon strip and the polysilicon strip.

* * * * *